United States Patent

[11] 3,617,558

| [72] | Inventor | Gary D. Jones<br>Rockford, Ill. |
|---|---|---|
| [21] | Appl. No. | 86,150 |
| [22] | Filed | Nov. 2, 1970 |
| [45] | Patented | Nov. 2, 1971 |
| [73] | Assignee | Illinois Water Treatment Co.<br>Rockford, Ill.<br>Continuation-in-part of application Ser. No. 840,109, June 16, 1969, now abandoned, which is a continuation-in-part of application Ser. No. 749,819, Aug. 2, 1968, now abandoned. |

[54] LAYERED ION EXCHANGE PROCESS
9 Claims, 10 Drawing Figs.

[52] U.S. Cl. .................................................. 210/35, 210/279, 210/290
[51] Int. Cl. .................................................. B01d 15/06
[50] Field of Search .......................................... 210/30, 32, 35, 37, 38, 80, 190, 275, 279, 290

[56] References Cited
UNITED STATES PATENTS

| 2,773,829 | 12/1956 | Hunting | 210/35 |
| 2,855,364 | 10/1958 | Roberts | 210/35 |
| 3,151,070 | 9/1964 | Corte | 210/190 |
| 3,382,169 | 5/1968 | Thompson | 210/32 |

*Primary Examiner*—Samih N. Zaharna
*Attorney*—Wolfe, Hubbard, Leydig, Voit & Osann ABSTRACT: In an ion exchanger having a single upright tank with upper and lower stratified beds of resins respectively adapted to absorbing different ions (cations or anions) of the same ionic polarity, a distributor for the inflow of water into the tank is disposed substantially at the interface between the two beds and used to effect the upward backwashing of the upper bed alone and, during regeneration of weak-and-strong-type exchange resins by the same regenerant passed successively through the beds of strong-and-weak-type resins, to dilute the regenerant to the concentration best suited for regeneration of the weak-type resin.

Fig. 3
CATION REGENERATION

Fig. 4
ANION REGENERATION

INVENTOR
Gary D. Jones
By Wolfe, Hubbard, Voit & Osann
ATTORNEY

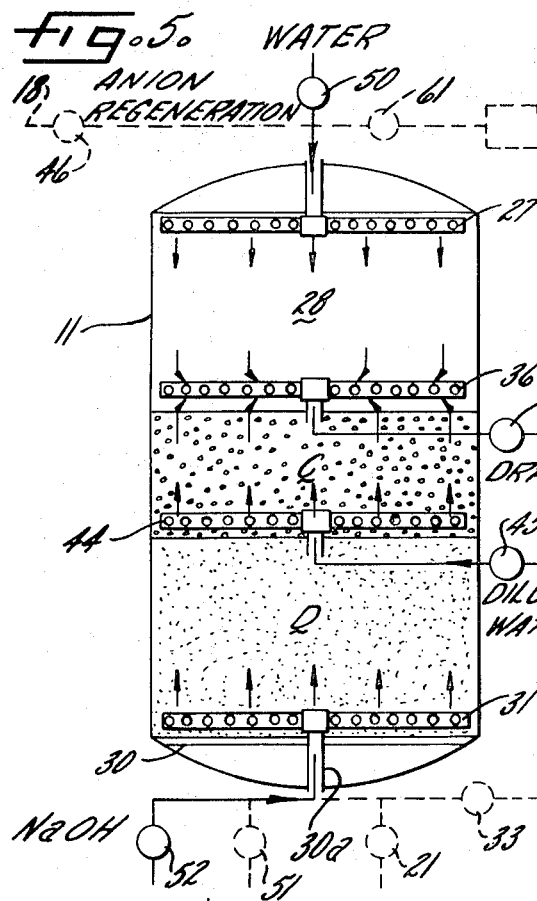
Fig. 5. ANION REGENERATION
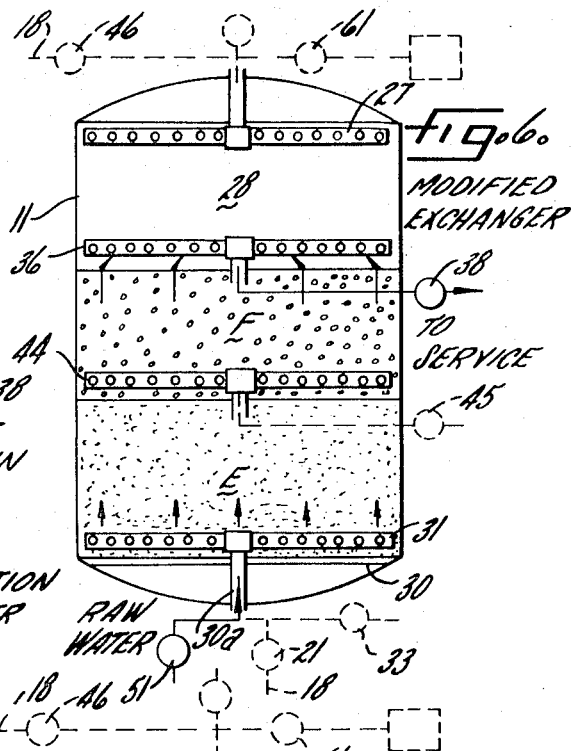
Fig. 6. MODIFIED EXCHANGER
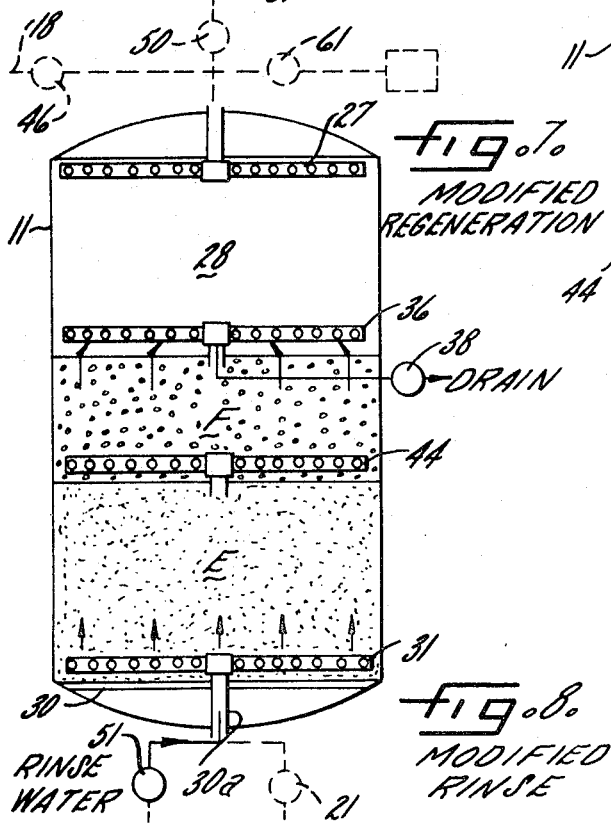
Fig. 8. MODIFIED RINSE
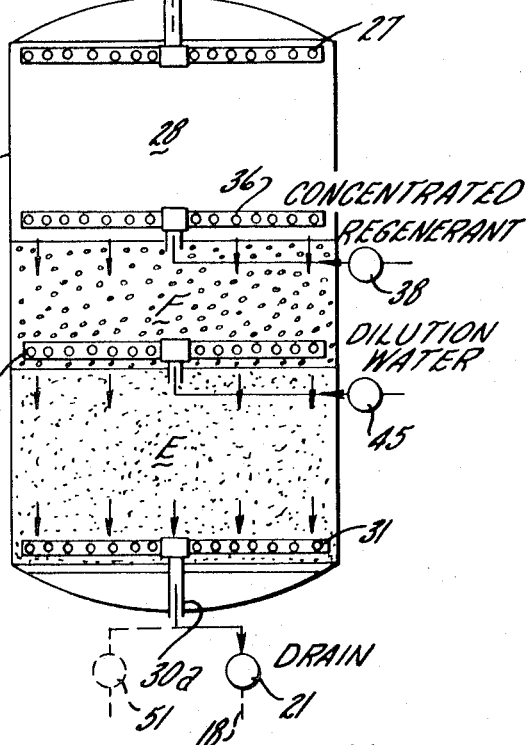
Fig. 7. MODIFIED REGENERATION
INVENTOR.
GARY O. JONES
ATTORNEYS.

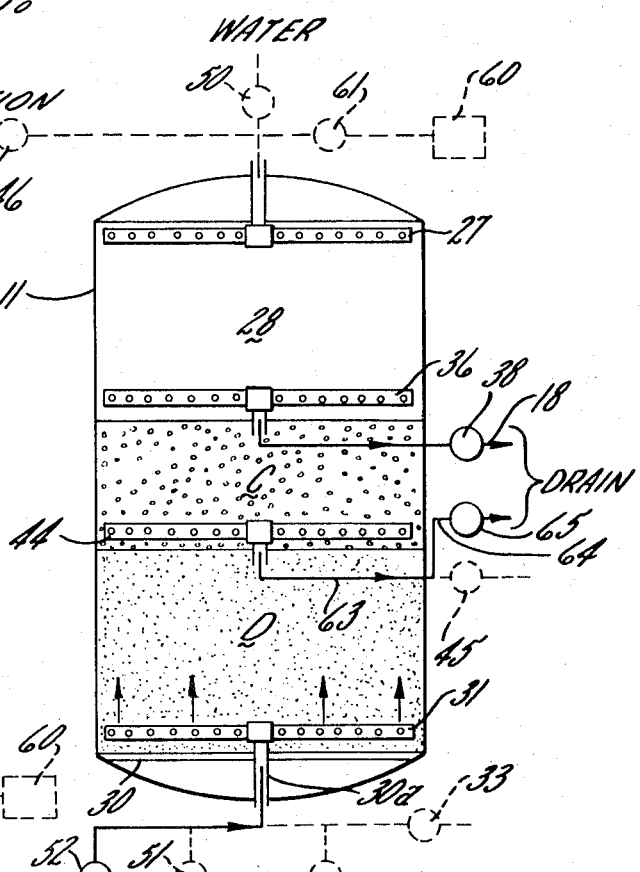
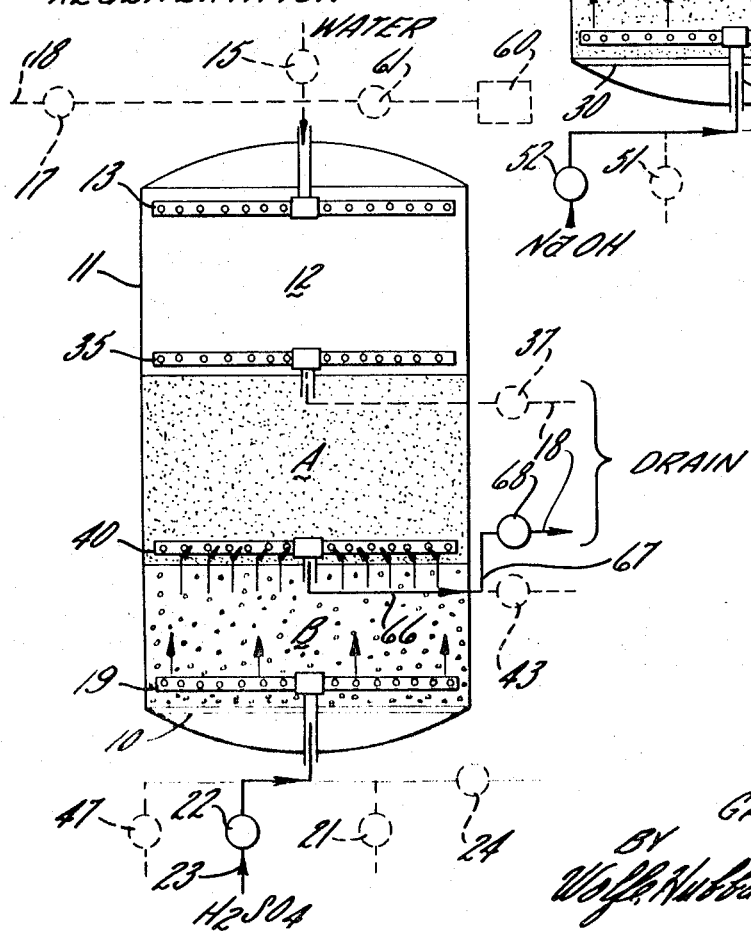

LAYERED ION EXCHANGE PROCESS

CROSS-REFERENCE TO RELATED APPLICATIONS

This application is a continuation-in-part of application Ser. No. 840,109, filed June 16, 1969, now abandoned which in turn is a continuation-in-part of application Ser. No. 749,819, filed Aug. 2, 1968, and now abandoned.

CROSS-REFERENCE TO RELATED APPLICATIONS

This application is a continuation-in-part of application Ser. No. 840,109, filed June 16, 1969 now abandoned, which in turn is a continuation-in-part of application Ser. No. 749,819, filed Aug. 2, 1968, and now abandoned.

BACKGROUND OF THE INVENTION

This invention relates to ion exchangers of the type shown in U.S. Pat. No. 3,382,169 in which upper and lower beds of different cation exchange resins (weak and strong base types) in a single cation exchange tank or upper and lower beds of different anion exchange resins (weak and strong acid types) in an anion exchange tank are maintained stratified in the respective tanks during the service and regeneration cycles. Heretofore, it has been necessary in such layered ion exchangers to employ resins of substantially different effective densities in order to insure accurate stratification of the two resins after backwashing and settling. lack of such separation and the intermixing of the two cation resins in a band at the interface is conducive to an early breakthrough of sodium ions from the strong acid resin and a resultant and corresponding decrease in operating efficiency. A similar intermixing of the anion resins is conducive to objectionable and premature breakthrough of silica ions from the strong-base anion resin accompanied by a decrease in operating efficiency.

SUMMARY OF THE INVENTION

The general objectives of the present invention are to overcome the above-mentioned difficulties, to avoid the necessity of selecting resins of widely different densities in order to maintain accurate stratification in service use, and to achieve optimum efficiency in regenerating by passing a single regenerant in proper and controlled concentration successively through the strong-and-weak-type resins of each pair of layers, cation or anion. These objectives involve the use of a distributor disposed approximately at the level of the interface between the upper and lower beds (A and B in the cation exchange tank (FIG. 1) or C and D in the anion exchange tank).

To enable the concentration best suited for regenerating the second one of the layers successively contacted by the regenerant to be controlled accurately, water at a controlled rate is forced into the tank through the interface distributor during regeneration of the cation exchanger so as to dilute the acid flowing through the bed of strong resin and produce the substantially lower concentration that is required for most efficient regeneration of the resin of the weak-type layer. The diluting action is also utilized to advantage in the two bed anion exchangers (FIG. 5) and in layered exchanger (FIG. 6). Thus, after passing from one end of the tank through the strong-type resin, the concentrated regenerant is diluted to the concentration best suited for regeneration of the resin of the other or weak-type layer, and the diluted regenerant is then passed vertically through the latter layer.

BRIEF DESCRIPTION OF THE DRAWINGS

FIGS. 2 and 3 are similar views of the cation exchanger showing the flow patterns during the backwashing and regenerating cycles.

FIG. 4 is a view similar to FIG. 3 showing the flow pattern during regeneration of the resin of the anion exchanger.

FIG. 5 is a view similar to FIG. 4 but showing a modified flow pattern for regenerating layered anion resins.

FIG. 6 is a view showing the upflow pattern during service operation of an exchanger in which the lower bed is the weaker type of resin.

FIG. 7 is a view showing the flow pattern for regenerating the beds of the exchanger shown in FIG. 6.

FIG. 8 shows the flow pattern of the water for rinsing the beds after downflow regeneration.

FIGS. 9 and 10 are views similar to FIGS. 3 and 5 but showing modifications.

DESCRIPTION OF THE PREFERRED EMBODIMENTS

Figure 1:
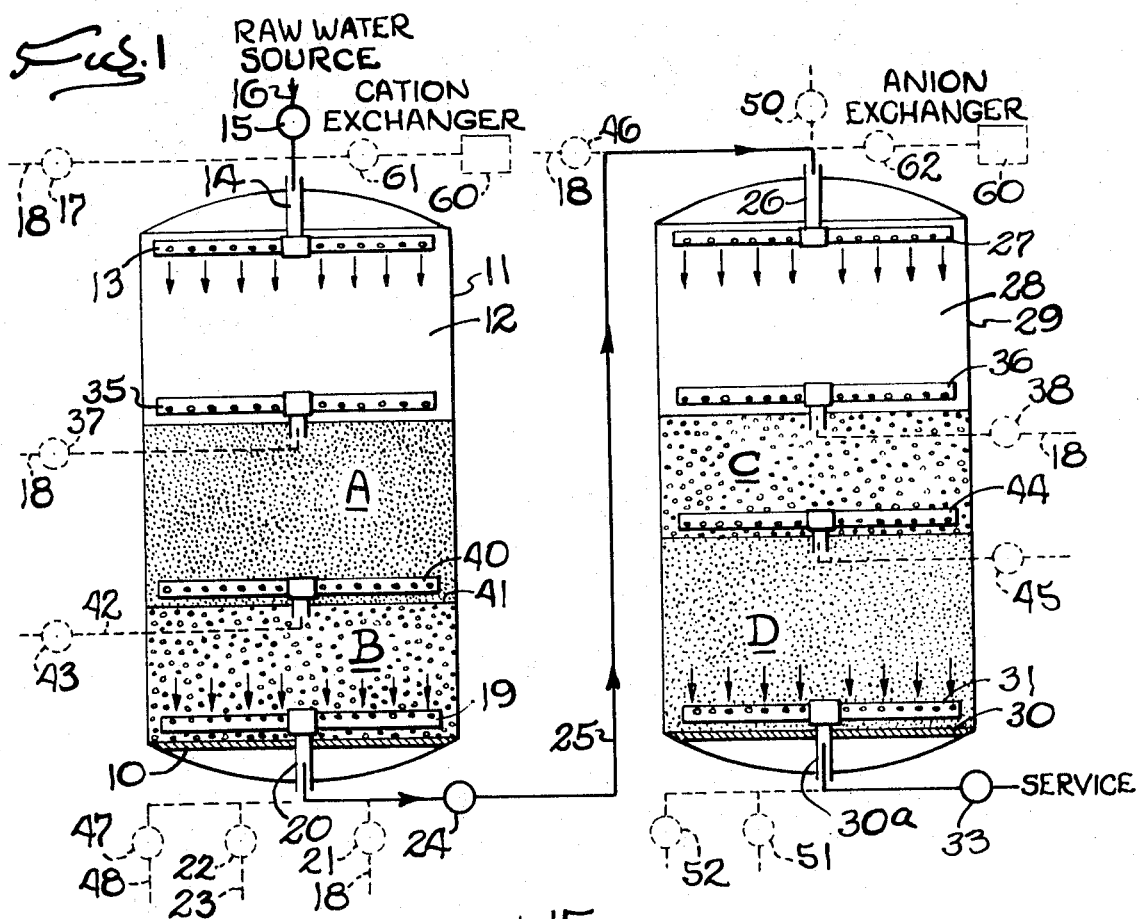
FIG. 1 is a schematic view and flow diagram of a water-deionizing system for practicing the present invention, the flow pattern for a service cycle being shown in full.

As in the patented system above referred to, the layers or beds of the A and B cation exchange resins (FIGS. 1 to 3) are supported in a conventional way as by a plate 10 and arranged one above the other in the lower part of a single upright tank 11 and below a freeboard space 12 containing a top distributor 13 communicating with an inlet 14 at the top of the tank and adapted to be connected (FIG. 1) through a valve 15 with a pipe 16 leading from a source of raw water or other aqueous solution to be treated or a valve 17 with a drain line 18. A similar distributor 19 adjacent the plate 10 communicates with a pipe 20 extending through the bottom of the tank and may be connected selectively through valves 21 and 22 to the drain line 18 or to a pipe 23 leading from a source of a regenerating solution, for example, sulfuric acid. Alternately and during the exchange or service cycle (FIG. 1), this distributor 19 is connected through a valve 24 with a pipe 25.

In the complete deionizing system shown in FIG. 1, the water decationized by downflow through the space 12 and successively through the beds A and B is delivered through the pipe 25 and through an inlet 26 and a distributor 27 in the top of a freeboard space 28 in a similar tank 29 and is forced downwardly through the beds C and D of anion exchange resins. These are similarly arranged one above the other and supported by a plate 30 above a bottom distributor 31 communicating with a pipe 30$^a$ extending downwardly through the bottom of the tank. Through a valve 52, this pipe and distributor may be connected with a source of regenerant solution, for example, sodium hydroxide or during the exchange cycle (FIG. 1) through a valve 33 with a pipe 34 leading to the point of use of the deionized water.

Distributors 35 and 36 are arranged in the tanks 11 and 29 adjacent and preferably immediately above the tops of the upper beds of the A and C resins when in the settled positions as shown in FIG. 1, these being connectable to the drain line 18 through valves 37 and 38 respectively. Each of the several distributors is disposed horizontally and is of conventional construction usually comprising tubular arms radiating from a central hub or extending crosswise from a pipe extending diametrically across the tank, the arms having holes usually covered by screens and spaced along the distributors so as to distribute the incoming or outflowing water or solution across the full cross section of the tank.

With the beds A, B, C and D and the tank inlets and outlets arranged as above described, the overall system shown in FIG. 1 may, by selecting proper commercially available resins of proper particle sizes and by employing proper amounts of the resins in beds of proper depth, be adapted for the economical deionization of water in which the hardness is attributable largely to bicarbonates of calcium and magnesium but which contain substantial amounts of sodium of chlorides and sulfates.

For treating such water, the A resin may be of the so-called weak acid type (R COOH) in which hydrogen ion of the carboxyl group is replaceable by the calcium and magnesium ions and to a lesser degree by the sodium ions associated with carbonic acid. One currently available resin of this so-called weak acid type is sold by Rohm & Haas by the designation IRC–84. In the commercially available form, this resin comprises spherical beads which have an actual wet density of 1.12 g. per cc. and which, in the calcium or magnesium forms are about 40 percent larger than in the regenerated or hydrogen form. Regeneration of this resin is effected most efficiently by dilute acid, for example, a 1 or 2 percent solution of sulfuric acid.

The B or sulfonic-type resin ($RSO_3H$), although possessing substantially lesser cation exchange capacity, is capable of exchanging hydrogen for all cations. Resins of this so-called strong acid type are sold under the designation of IR-120 (Rohm & Haas) and Dowex 50 (Dow Chemical Co.). They possess an actual wet density of 1.28 g. per cc. and the beads shrink in volume in being converted from the hydrogen form, the shrinkage being about 7 percent in the case of sodium form. To regenerate this resin, a relatively strong solution of sulfuric acid, for example, 4 to 10 percent, is ordinarily used.

The weak base of styrene type (C) of anion resin has an $NH_2$ group which combines with and removes the strong acids in the water. A resin of this type sold by Rohm & Haas by the designation IRA-93, possesses an actual wet density of 1.10 and the beads thereof swell about 15 percent during exhaustion of the resin. Such resin would be used where it is desired to leave the effluent substantially free of chloride and sulfate anions.

For the strong base anion exchange resin (D), one sold by Rohm & Haas as IRA-400 or by Dow as Dowex 1 is preferably employed. This is a so-called quaternary compound having an OH group replaceable by the weak acid anion ($HCO_3$) to form water. The beads of this resin shrink about 20 percent in volume during the exchange reaction and the actual wet density is 1.12. Such a resin is especially suited for the efficient removal of weak acids. The anion resins are usually regenerated by a 2 to 10 percent solution of sodium hydroxide forced upwardly through the beds D and C successively.

Figure 2:
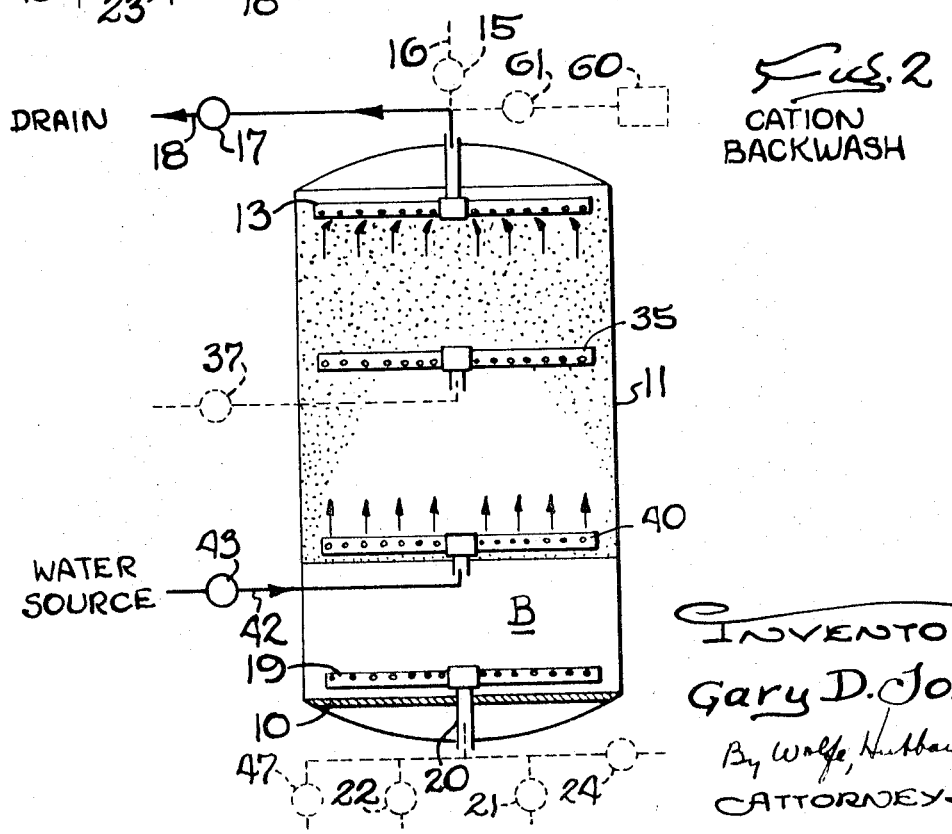

As compared with the patented system, the present invention avoids the necessity of selecting resins A and B or C and D whose effective densities differ widely while at the same time providing for much more efficient regeneration of the A and B resins than has been attainable heretofore. This improvement is based on the fact that virtually all of the foreign matter carried into the top of the cation exchange tank with the water to be treated is filtered out and retained in the upper resin bed A and can be disposed of by backwashing only the upper bed A after each service cycle followed by a flow of the regenerant solution upwardly through both of the beds. To effect such backwashing, an additional distributor 40 of the same construction as the distributors above described disposed substantially at the level of the interface or line of contact 41 between the upper and lower resin beds A and B and adapted for the admission of water into the tank 11 and the distributed delivery thereof across the full cross section of the tank in an upward direction and at a rate sufficient to expand all of the particles of the A resin upwardly into the freeboard space 12 without substantially disturbing the positions of the particles of the resin in the lower bed B. The inlet 42 to the distributor 40 is adapted to be connected through a valve 43 with a source of water or other solution, the valve being adjustable manually or automatically to provide the proper rate of flow for expanding the bed A as illustrated in FIG. 2 and wash out through the top of the tank broken resin particles and foreign matter trapped in the bed during the previous exchange cycle. The outlet holes in the distributor 40 are preferably faced or are inclined upwardly so as to direct the backwash water upwardly and thus facilitate expansion of the resin of the bed A while leaving the lower resin bed B in its compacted condition.

An interface distributor 44 in the anion exchanger is used in the same way to expand the upper bed C upwardly into the freeboard space 28 in the tank 29, relieve any compacting of the bed, and washing out of the tank fine or broken resin particles that may be carried into the anion exchanger with the decationized water or formed during repeated service cycles. Such backwashing is effected by closing the valve 24 and opening valves 45 and 46 to force water into the tank 29 for expanding the resin C into the freeboard space 28. As before, the anion resin of the lower bed D is not disturbed during the backwashing. After interruption of the water flow into and through the distributor 44, the resin particles settle down and reform the bed C on top of the bed D thus conditioning the anion exchanger for regeneration.

Figures 3, 4:
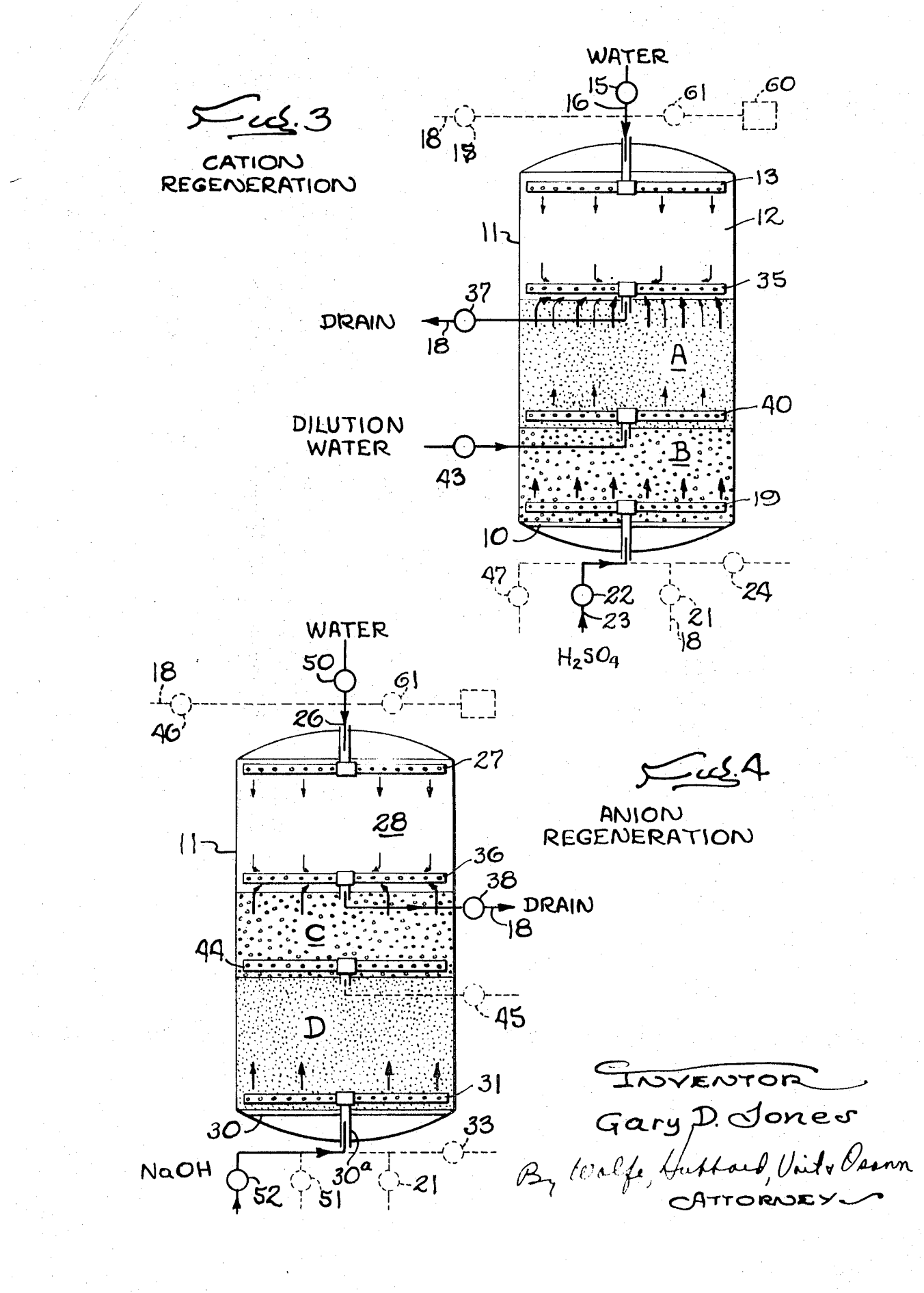

While the interface distributor 40 of the cation exchanger may be used in other ways in the regeneration of the layered resins in accordance with the present invention, it is preferably utilized as illustrated in FIG. 3 to permit water at a selectively controlled rate to be introduced into and combined with the strong acid regenerant passing upwardly from the top of the resin bed and into the bed A. For this purpose, the valve 43 is opened during the regeneration cycle and adjusted for the admission of water through the distributor at a rate which will, for any particular installation, dilute the acid to the lower concentration required for most efficient regeneration of the weak acid resin A. By providing for such dilution of the acid regenerant and for accurate control of the concentration thereof, the danger of precipitating calcium sulfate within the resin bed A is eliminated.

Upflowing of the acid regenerant through both of the beds A and B and the increased flow through the diluting water through the distributor 40 is facilitated by the so-called counterflow method of regeneration illustrated in FIG. 3. That is to say, by opening the valve 15 to the proper degree during the regeneration procedure, the water forced into the top of the tank 11 through the distributor 13 will flow downwardly and meet the upflowing regenerant at the distributor 35 and thus oppose and prevent expansion of the settled resin of the bed A. The opposing streams of water and spent regenerant thus combined flow into the distributor 35 and escape from the tank and to the drain line through the valve 37 which remains open during the regeneration cycle. During the upflow of the regenerant through the lower bed B, minute particles of foreign matter which may not have been filtered out by the upper bed A in the previous service cycle will migrate into the voids of the bed A and be carried upwardly by the dilution water or carried out of this bed in the next backwashing cycle of the cation exchanger.

Assuming that with the valves conditioned as shown in FIG. 1, a service cycle for delivering water through the pipe 34 has been concluded and the cation and anion resin beds are to be regenerated. For this purpose, the valves 17 and 43 of the cation exchanger are opened and the other valves closed as illustrated in FIG. 2. As described above, the water entering the tank at the proper rate through the interface distributor 40 expands the resin of only the upper bed A, the foreign matter trapped in this bed from the service cycle being washed out of the tank through the upper distributor 13. The positions of the resin particles of the lower bed B are not disturbed, and the particles of resin A will reform into a bed of the former depth upon closing the valve 43 to interrupt the backwash flow. The upper bed C of resin in the anion exchanger may be backwashed in the same way by opening the valves 45 and 46 and closing the valve 24 after termination of the service cycle of the two ion exchangers.

After backwashing the resin of the bed A, the cation exchanger is conditioned for regeneration of both beds by a sulfuric acid solution, for example 4 percent, forced into the bottom of the tank 11 through the valve 22 and the distributor 19 while the valves 17 and 24 are closed and the valves 15, 37 and 43 are open as shown in FIG. 3, the valves 15 and 43 being adjusted to provide the proper force opposing the flow of regenerant upwardly from the top of the bed A and for dilution of the acid passing the top of the lower bed B to a concentration, for example, 1 percent, for most efficient regeneration of the A-resin.

The regeneration is terminated by closing the valves 22 and 43 and opening a valve 47 to admit rinse water from a line 48 for washing the excess acid out of both of the beds A and B. The downflow of water from the upper distributor 13 is continued during the rinsing so as to avoid expansion of the resin beds. By closure of the valves 37 and 47, the rinsing is terminated, and the cation exchanger may be conditioned for another service cycle by opening the valves 15 and 24, the other valves being closed.

As in the case of the cation exchanger, the upper bed C only of the anion exchanger is backwashed as above described as a preliminary to regenerating of the resins C and D by forcing water into the tank 29 at the proper rate while the top opening 26 is open to the drain 18. To regenerate the two resins C and D, the sodium hydroxide solution of the proper concentration is forced into the bottom of the tank through a valve 52 while the valve 50 is open to produce a downflow of water through the freeboard space to meet the upflowing regenerant at the distributor 36 and flow therewith to the drain through the then open valve 38. In treating water of low silica content, the valve 45 is maintained closed during the regeneration since dilution of the solution for regenerating the C-resin is not necessary. Rinsing of the regenerated resins is effected by the upflow of water therethrough from a valve 51 and the lower distributor.

In the service use of the layered anion exchanger above described for treating waters of high silica content, the interface distributor 44 may be utilized to minimize the danger of precipitating silicic acid in the upper layer C. In the regeneration, the caustic regenerant strips the weak acids including silicic from the strong base layer D and neutralizes this acid which is only slightly soluble in water but more soluble in the caustic solution. Thus as the latter passes into the upper weak base layer which has, during the service cycle, absorbed strong acids, the caustic is neutralized producing an acid condition which allows silicic acid to form as a precipitate in the upper layer C if the silica concentration of the raw water to be treated is relatively high. Such danger of silica precipitation may be reduced by diluting the caustic regenerant as it passes upwardly from the lower bed D into the upper bed C. To this end, the valve 45 is opened during the regeneration to provide the flow pattern shown in FIG. 5.

Alternatively, the danger of silica precipitation in the layer C may be avoided by connecting the interface distributor 44 to the drain line 18 thus allowing the first part of the regenerant reaching the interface to be diverted out of the tank 29 without contacting the C resin. For this purpose and as shown in FIG. 9, the pipe 63 for delivering the dilution water tank 11 and to the distributor 44 is connected between the valve 45 and the distributor to a pipe 64 leading to the drain through a valve 65.

To condition the anion exchanger for the modified regeneration, the valves 52 and 65 are opened and the remaining valves are closed as shown in FIG. 9. Strong caustic regenerant thus admitted into the bottom of the tank flows upwardly through the resin of the bed D and, upon reaching and entering the interface distributor 44, is diverted out of the tank and through the valve 65 to the drain. Only a small part of the total regenerant is discarded in this way, the amount depending largely on the silica content of the water being treated and seldom amounting to as much as one-fourth of the total volume of the regenerant used.

After the predetermined volume of the initial regenerant reaching the interface has been discarded to the drain through the distributor 44, the valve 65 is closed and the valves 38, 45 and 50 are opened thus conditioning the anion exchanger as shown in FIG. 5. The remainder of the caustic flowing up past the interface distributor 44 enters the distributor 36 as before and is diverted to the drain.

In ion exchangers of the character described, the various valves are power actuated and the opening and closing thereof is programmed automatically to produce the desired service and regeneration cycles. By such programming, provision would be made for closing the valve 65 and opening the valve 45 substantially simultaneously at the proper time in the regeneration cycle.

The danger of calcium sulfate or other precipitate being carried into the upper cation bed A by the partially spent acid first passing the interface 41 may be reduced in a similar manner. To this end and as shown in FIG. 10, the pipe 66 for conveying dilution water into the tank and to the distributor 40 is connected between the valve 43 and the distributor to a pipe 67 leading to the drain through a valve 68.

To condition the cation exchanger for the modified regeneration, the valves 22 and 68 are opened and the remaining valves are closed as shown in FIG. 10. The strong acid regenerant thus admitted to the bottom of the tank flows upwardly through the resin bed B and, upon reaching and entering the interface distributor 40, is diverted out of the tank and through the valve 68 to the drain. Only a small part of the total regenerant charge is discarded in this way, the discarding being interrupted at the proper time by closing the valve 68 and opening the valves 15 and 43. The regeneration of the two beds A and B then proceeds as described above and as illustrated in FIG. 3.

If desired and during regeneration, the two beds A and B or C and D may be held in the compacted positions in a manner other than that described above. For this alternative, the water in the freeboard space 12 or 28 is displaced by air under sufficient pressure to hold the resins properly compacted during the flow of regenerant upwardly through the two beds. To accomplish this after backwashing the resin of the upper layer and settling of the particles thereof, the valve 37 in the case of the cation exchanger is opened and compressed air from a source 60 is admitted to the top of the tank 11 through a valve 61. The water in the freeboard space 12 is thus forced downwardly and out of the tank to the drain line, the admission of air being interrupted when the water level in the tank is lowered to a point just above the distributor 35. Suitable and preferably automatically acting means is provided for regulating the further admission of air to the tank to maintain this water level during the upflow of the regenerant through the resin beds and the subsequent upflow of the rinse water. A similar dome of air under low pressure may be formed in the freeboard space 28 of the anion exchanger by opening a valve 62 in a line between the air pressure source 60 and the top of the tank 29.

In the regeneration of certain anion exchange resins, it is desirable to separately treat the resin of either the upper or the lower beds to dispose of organic material as well as dissolved minerals. For example, it is sometimes desirable, for efficient regeneration of the upper bed C to pretreat this bed with a brine solution without contact of the brine with the resin of the lower bed D. The interface distributor 44 above described may be used to perform this new function by providing a valve for admitting brine from a suitable source through this distributor for a limited period while water is being admitted through a valve 50 and the upper distributor 27 and flowing downwardly to meet the brine and escape through the distributor 36.

As pointed out above the present invention provides for operation of layered cation exchangers or layered anion exchangers of the type shown in the aforesaid patent but with optimum efficiency in service use and also without regard to the relative different densities of the resins in order to insure proper stratification for service use. Thus, it is possible to employ a weak-type resin, cation or anion, which, instead of being lighter, possesses an effective density actually greater than that of the strong-type resin. With such a combination, the layer F of the weak-type resin would be arranged initially below the bed of the strong type as shown in FIG. 6.

For service operation with the strong- and weak-type resins F and E thus arranged, the various valves above described would be conditioned as shown in FIG. 6 for the admission of the water to be treated into the bottom of the tank and the upward flow successively through the two beds E and F to the distributor 36 through which the treated water would be directed through suitable valving to the second ion exchanger or from the latter to the point of use. During this service cycle, the tank space above the upper bed would be closed or maintained under controlled air pressure. After exhaustion of this layered exchanger by the upflow of raw water through the stratified beds E and F, regeneration of the two beds would be effected by admitting the concentrated regenerant into the tank through the valve 38 and the upper distributor 36 and by opening of the drain valve 21 to cause a downward flow first through the bed of strong-type resin F and then through the lower bed of the weak-type resin following the flow pattern shown in FIG. 7. During such regeneration, dilution water for the purposes described above would be admitted to the tank through the valve 45 and the interface distributor 44.

After regeneration of the resins F and E, the excess regenerant would be rinsed out of the two beds by admitting water through the valve 51 for upward flow thereof as shown in FIG. 8 first through the lower bed E and then through the upper bed F and out the distributor 36. Expansion of the beds during such rinsing may be prevented by simultaneously forcing a controlled counterflow into the tank through the upper distributor 27 by the air dome method as described above.

It will be apparent from the foregoing that in layered cation and anion exchangers of the types described, numerous advantages result from the use of the distributors 40 and 44 located at the interface between upper and lower resin beds. First is the increase in overall operating efficiency as compared with the method disclosed in the aforesaid patent and due to the maintenance of accurate stratification of the two resin layers through prolonged service use without regard to the relative effective densities of the resins A and B or C and D and the manner of achieving by dilution of the partially spent regenerant passing the strong-type resin, the proper and reduced concentration for most efficient regeneration of the weak-type resin by the same regenerant.

I claim:

1. For utilizing two beds of strong- and weak-type resins for removing different ions of the same ionic charges from an aqueous solution flowing successively first through the weak resin bed and then through the strong resin bed, the different resins being stratified and supported one above the other in an upright tank, the method of regenerating the resins of said beds which includes the steps of forcing into said tank a concentrated solution for regenerating the resins of both of said beds while causing a flow of such solution first through the resin of said strong type and then on through the weak-type resin, and, during such flow, forcing water into said tank substantially at the interface between the two beds whereby to dilute the regenerating solution passed into and through the weak-type resin.

2. The method defined in claim 1 including the preliminary step of forcing water under pressure into said tank at a level adjacent the interface between the upper and lower resin layers and at a rate sufficient to expand the particles of said upper layer into a freeboard space above the upper layer and thus wash such matter out of the top of the tank without substantially disturbing the positions of the resin particles of said lower bed and the stratification of the two beds.

3. The method defined in claim 1 in which the layer of strong-type resin is disposed in said tank below the layer of weak resin and said regenerant is flowed upwardly through the tank.

4. The method defined in claim 1 including the additional steps of withdrawing from said tank, at a point adjacent said interface, the first part of said regenerant passing through said strong resin layer, and interrupting such withdrawal and allowing the remainder of the regenerant passing such resin layer to flow onwardly through the weak resin layer after being diluted by the water introduced adjacent the interface.

5. The method defined in claim 4 in which the amount of said withdrawn regenerant is a small fraction of the total regenerant volume.

6. For utilizing two beds of strong- and weak-type resins for removing different ions of the same ionic charges from an aqueous solution flowing successively first through the weak resin bed and then through the strong resin bed, the different resins being stratified and supported one above the other in an upright tank, the method of regenerating the resins of said beds which includes the steps of forcing into said tank a concentrated solution for regenerating the resins of both of said beds while causing a flow of such solution first through the resin of said strong type diluting the partially spent regenerant after the same has passed through said strong-type resin and to a concentration adapted for efficient regeneration of said weak-type resin, and flowing the diluted regenerant vertically through said weak-type resin.

7. In the operation of the ion exchanger as defined in claim 3, the additional steps for forcing water into the top of said tank to oppose the upflow of the combined upward flows of said regenerant and dilution water, and withdrawing said combined flows from said tank near the top of said upper resin bed.

8. In the operation of the ion exchanger as defined in claim 3, the additional step of maintaining said freeboard space filled with air during the upflow of said regenerant through said lower and upper beds while withdrawing the excess regenerant from the tank near the top of the upper resin bed.

9. The method of ion exchange using upper and lower beds of strong- and weak-type resins respectively confined in an upright tank and adapted to remove different ions of the same ionic charge from an aqueous solution, the steps of flowing a solution to be treated into said tank at the bottom thereof and withdrawing the same from the tank at a level adjacent the top of said upper bed, and, after exhaustion of the resins, interrupting such flow and regenerating both of the resins by flowing a solution of a regenerant therefor into said tank at a level adjacent the top of said upper resin bed, withdrawing said regenerant solution from the bottom of the tank and, during the downflow of said regenerant solution successively through said upper and lower beds, introducing water into said tank substantially at the interface between said upper and lower beds so as to dilute the regenerant passing downwardly through the lower bed.

* * * * *